United States Patent [19]
Balaz et al.

[11] 3,832,815
[45] Sept. 3, 1974

[54] MODULAR INSULATION OF FIBROUS MATERIAL

[75] Inventors: Joseph K. Balaz, Northbrook; Richard A. Kelly, Prospect Heights; Wolfgang Schulze, Buffalo Grove, all of Ill.

[73] Assignee: Flinn & Dreffein Engineering Company, Northbrook, Ill.

[22] Filed: Jan. 29, 1973

[21] Appl. No.: 327,705

[52] U.S. Cl. ............... 52/227, 52/404, 52/506, 52/509, 110/1 A, 161/403
[51] Int. Cl. ............... E04c 3/10, E04b 1/80
[58] Field of Search ............... 52/227, 249, 404–407, 52/509, 506; 110/1 A; 161/403, 60

[56] References Cited
UNITED STATES PATENTS
1,197,842  9/1916  Meier ............................... 52/509
1,555,914  10/1925  Denning ............................. 52/227
1,928,264  9/1933  Powell ............................... 161/60
2,576,698  11/1951  Russum ............................. 52/249 X
3,141,206  7/1964  Stephens ........................... 52/406 X
3,336,716  8/1967  Scheppers ......................... 52/249 X
3,491,910  1/1970  Buckwalter et al. ............. 52/406 X Primary Examiner—Alfred C. Perham

[57] ABSTRACT

Ceramic fiber insulation for lining furnaces in which the insulation fibers are formed into prefabricated modules by compression members located at the outer, cold side end portion of the insulation layer and by which the modules are mounted in position of use on the furnace wall.

18 Claims, 6 Drawing Figures

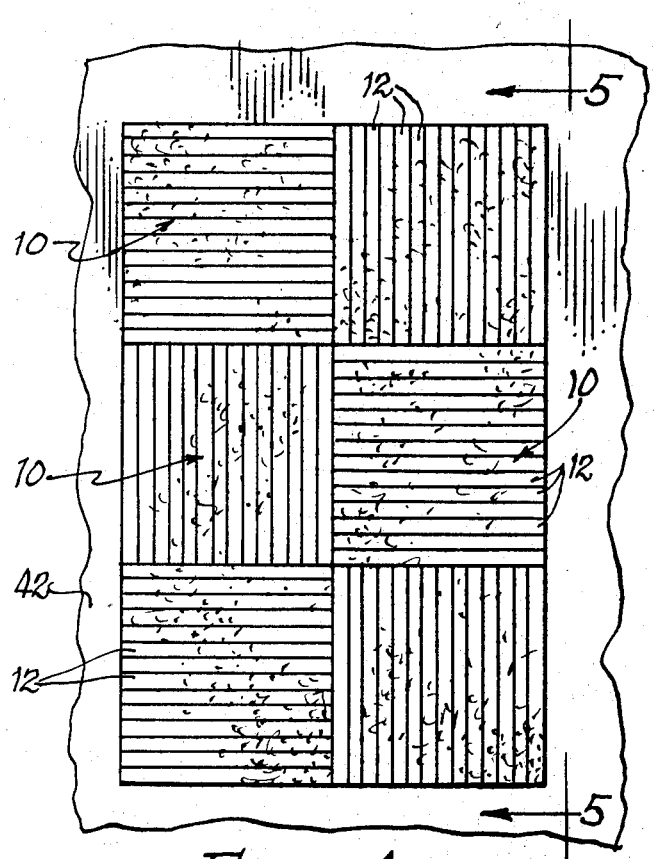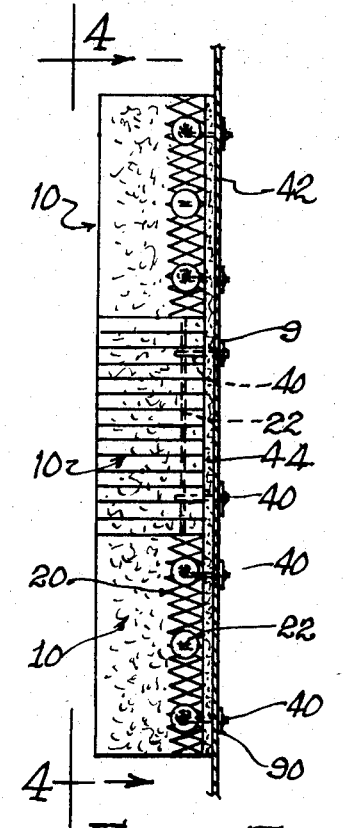

MODULAR INSULATION OF FIBROUS MATERIAL

This invention pertains to a novel insulation lining for furnace walls and to process furnaces lined with an insulation layer of ceramic fibers.

Refractory material, containing a high percentage of alumina, has been produced in fibrous form and felted into blankets of various thickness and density. When used as an insulation layer, this material is characterized by good retardation of heat flow from the interior of furnaces to the outer surfaces of furnaces. Also, because of the very light density of the fibrous blanket, a furnace lined with such material stores a very small amount of heat in the furnace lining and thus permits rapid rates of heating and cooling with a concomitant economy of heat especially when the process heating furnace is frequently cycled up and down in temperature. Furthermore, the light weight of a ceramic fiber furnace lining permits the use of structural supporting members of lesser strength and weight than would otherwise be required for refractory linings of greater weight.

Unfortunately, ceramic fiber blankets, which have heretofore been produced, are not mechanically strong. This material must be handled with great care to avoid tearing. Furthermore, the ceramic fiber blankets have differing values of mechanical strength, depending somewhat upon the orientation of the fibers with respect to the direction of applied forces.

Though numerous techniques have been employed for fastening the ceramic fiber blankets to the furnace shell (usually steel sheet or plate), the most commonly used fastening means comprises a plurality of alloy wires having a "pig tail" formed on one end thereof which extends into contact with the hot face of the blanket and is exposed to the interior of the furnace, with the straight portion of the wire fastener extending transversely through the blanket to the outer surface of the furnace, where it can be welded as a stud to the furnace shell or passed through a hole in the shell and fastened, as by a spring washer outside the shell. Such alloy wire fasteners detract from the ability of the ceramic blanket to retard heat flow from the interior of the furnace towards the exterior surface because of the great thermal conductivity of the alloy in comparison to the ceramic blanket. Furthermore, such alloy wire fasteners, exposed to the interior furnace temperature, limit the temperature to which the furnace can be raised because of pyrolitic deterioration of the alloy wire.

It is an object of this invention to produce and to provide a method for producing a heating furnace thermally lined with a blanket of ceramic fibers, wherein the blanket is characterized by high strength and stability; which is of low weight and thermal conductivity; which can be preassembled into modules for low cost and effective installation; in which modules of the insulation lining can be removed for repair or replacement; in which elements which are subject to high heat conductivity or thermal deterioration are not exposed to the elevated temperatures in the interior of the furnace whereby limitations to furnace temperature are not imposed by the lining; in which the lining is characterized by long life at elevated temperatures; and in which the shape of the lining is maintained by compression which takes place as an incidence to insulation.

Ceramic fiber blankets are characterized by greater strength in a direction parallel to the surfaces of the blanket than they have transverse to these surfaces. Furthermore, because of the manner in which the ceramic fibers are felted to form blankets, the blankets are somewhat lamellar in structure and thus prone to easy separation in layers substantially parallel to the surfaces of the blanket. Thus, in accordance with the practice of this invention, the ceramic fiber blanket material is arranged in a manner as to take advantage of the superior strength in a direction substantially parallel to the surfaces of the blanket and in a manner to eliminate the peeling type deterioration of the blanket along lamellar plates.

Ceramic fiber blanket material is known to shrink slightly when exposed to temperatures in excess of 2,000°F. Previous methods for utilization of blankets of insulation fibers to the lining of furnaces have encountered difficulties caused by said shrinkage of the material. Separations or fissures transverse to the hot face of the furnace lining are often produced. Such fissures readily pass heat from the interior of the furnace towards the furnace shell. An object of this invention is to prevent the development of fissures transversing the furnace lining.

An important concept of this invention resides in the utilization of a modular concept of prefabricated components which greatly facilitates installation of the furnace lining. This modular construction also facilitates replacement of any portions of the furnace lining which may inadvertently become damaged. The modular components are much more rugged than the blanket itself before it is formed into said modular components. The prefabricated modules are much less liable to damage than the blanket from which they are formed. Handling of the fragile blanket material for assembly of the modules can be done in an environment much less prone to damage the blanket than that afforded inside the furnace. As a matter of fact, the design of the modular components is such as to permit mechanization of their assembly which will minimize manipulation of the blanket material.

These and other objects of this invention will hereinafter appear and, for purposes of illustration, but not of limitation, embodiments of the invention are shown in the accompanying drawings, in which FIG. 1 is an elevational view from the outside of a typical furnace lining module taken along line 1—1 of FIG. 2, embodying features of this invention;

FIG. 4 is an elevational view of a section of furnace lining showing the modules in position of use; and FIG. 5 is a sectional view taken along line 5—5 of FIG. 4.

The concepts of the present invention reside in a furnace lining comprising modular components fabricated of high temperature ceramic fiber blanket material, wherein the blanket material is arranged in layers in which the fibers in the layers are disposed substantially perpendicular to the hot face of the furnace lining, said layers being compressed during assembly into a resilient bundle calculated to compensate for thermal shrinkage of the blanket material. Prior compression of the blanket layers in this manner places the surfaces of the blanket material adjacent to similar surfaces of other blanket layers where mutually shared forces of compression inside the bundle prevent lamilar peeling of the exposed surfaces of the felted blanket.

Compression forces inside each furnace lining module are resisted by pins threaded substantially perpendicularly through the blanket layers and disposed near the outer and cooler face of the module, that is, remote from the interior of the furnace. Said pins not only serve to hold the ceramic fiber blanket layers in compression but can also be utilized to affix the modules in their assembled relation to the furnace shell, as by means of pin engaging hooks which are fastened to the furnace shell. Said pins and hooks, being situated remotely from the hot face of the furnace lining, are not subjected to the deleterious effects existing within the interior of the hot furnace. Furthermore, because of their location, they do not afford a highly conductive path for heat to travel from the inside of the furnace to the outside surfaces of the furnace.

Supporting forces, transmitted to the ceramic fiber material by the pins, are thus directed substantially parallel to the direction of the greatest strength of the blanket.

The layers of blanket material in adjacent modules preferably are oriented with 90° alternating rotation in the furnace lining assembly so that the preset compression forces in the modules are brought to bear against adjacent modules.

Compressional forces between modules may be advantageously augmented by forming the modules with strips of ceramic blanket of trapezoidal configuration instead of rectangular configuration, with the broader base of the trapezoidal strips facing the interior of the furnace. In this embodiment of the invention, the modules have a substantially frusto-pyramidal configuration. As such frustro-pyramidal shaped modules are drawn into their intended position in the furnace lining, as by the aforementioned supporting hooks, they are squeezed into the configuration resembling that of a rectilinear parallelopiped. Thus, the hot face of the furnace lining becomes laterally compressed in all directions parallel to the hot face of the lining, such compressive forces being maintained by the resilience of the ceramic fiber blanket material.

Figure 1:
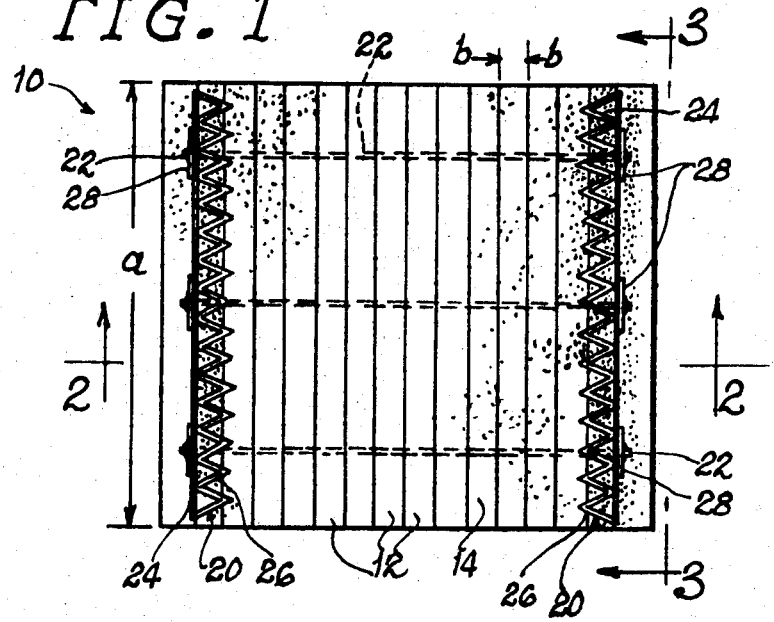

Referring now to the drawings for a more detailed description of the invention, illustration is made in FIG. 1 of a module 10 formed of a plurality of strips 12 arranged in side by side parallel relation, in which the strips are each formed of ceramic fibers 14 interfelted or otherwise interbonded with the fibers being generally oriented to extend endwise in substantially parallel relation lengthwise of the strip and substantially perpendicular to the crosswise (a-a) or widthwise (b-b) direction of the strip.

Representative of the ceramic materials of which the fibers are formed are fused silica, high silica glass, betonite or other aluminum oxide such as marketed in the form of fiber blankets under the trade name Kaowool by Babcock and Wilcox, or Fiber Frax by Carborundum Corporation.

Use can be made of blankets fabricated of continuous fibers formed by rapid attenuation of molten streams of the ceramic material, or of discontinuous, wool fibers formed by high velocity stream of air or steam directed angularly downwardly onto molten streams of the ceramic material issuing from bushings at the bottom of a melting furnace. Such fibers are collected to form a continuous web of the desired thickness of ¼ – ¾ inches and preferably ⅜ – ⅝ inches with the fibers layed down or combed to extend generally in the lengthwise direction.

Retention of the ceramic fibers in the web and strips formed thereof is achieved by interfelting of the fibers as they are deposited to form the web and/or use can be made of an interbonding agent applied to the fibers before or during deposition. For this purpose, use can be made of conventional organic adhesives such as a phenol-aldehyde resin, amide aldehyde resin; polyepoxide and polyurethane resins, natural resins and the like. Such additional binding agents, which may be employed in amounts ranging from 0.5–5 percent by weight of the fiber web, function as interim binders in that they are substantially completely burned out at the high temperatures to which the fiber layer is exposed in the furnace.

Strips 12 of the desired length and width for assembly of modules 10, can be cut directly from the formed web of ceramic fibers. For furnaces operating at lower temperatures, use can be made of strips having a length as low as two inches, while strips having a length as great as ten inches can be used. Within this range best use is made of strips having a length within the range of 3–8 inches and preferably 4–6 inches. Strips having a length of one inch has been found to be inefficient as a heat barrier and the temperature gradient is insufficient. On the other hand, strips having a length of twelve inches provide a temperature gradient which is too great for efficient use. The strips are cut to widths corresponding to the desired dimension of the module, which for purposes of convenience in assembly and handling will usually range from 6–12 inches.

Figure 3:
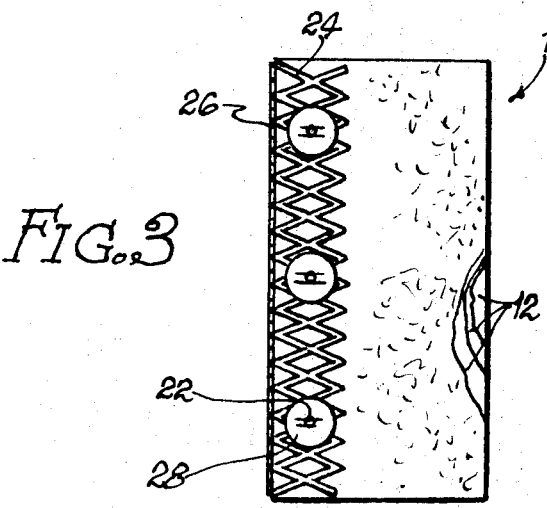
FIG. 3 is a side elevational view of the module taken along line 3—3 of FIG. 1.
Figure 3A:
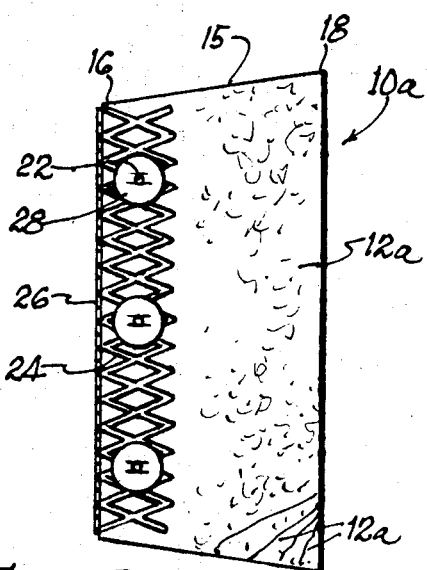
FIG. 3a is an alternate side view of the module taken along line 3—3 of FIG. 1.

For purposes of introducing compressive forces at the exposed inner portions of the fiber layer, responsive to the assembly of the strips to form the module, as will hereinafter be described, the strips 12 can be cut or otherwise formed of trapezoidal shape, as shown in FIG. 3a, with side edges 15 which are angled instead of straight to provide a strip of increasing width from the outer edge 16 to the inner edge 18.

Figure 2:
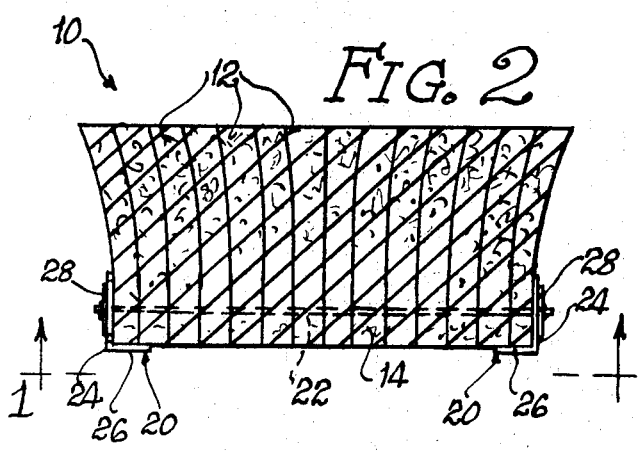
FIG. 2 is a sectional view of the module taken along line 2—2 of FIG. 1.

In the module 10, the strips 12 are secured in side-by-side parallel relation, as by the retainer members 20 positioned adjacent the outer edges of the outer most strips and interconnected one to the other by means of laterally spaced apart connecting pins 22 which extend through the aligned strips 12, adjacent their outer end portions, with a spaced relation between retaining members which is less than the normal thickness of the aligned strips, with the result that the outer end portion of the combined strips are maintained under compression while the strips flare outwardly from the pinned portion to the inner edge, as shown in FIG. 2. Reduction in thickness up to one-half the normal thickness to provide 50 percent compression can be employed but it is more desirable to provide for compression in the range of 20–40 percent and more preferably 25–30 percent. Under these conditions, an average density of about 8 pounds per cubic foot is achieved with blankets of Kaowool.

In the illustrated modification, the retainer members 20 comprise elongate strips of expanded metal having a length corresponding to the width of the strips 12 and formed to L-shape in cross section. The retainer members are adapted to be positioned at the opposite inner corner portion of the outermost strips with one flat arm 24 of the L-shaped member along side the strips with the base portion 26 abut the outer ends of the strips. The pins 22 extend through the strips adjacent their outer end portions at a level to extend through aligned openings in the arms 24, with the through extending portions engaged by lock type nut members 28 for securing the retainer members in the desired spaced relation while the pins plus the retainers fasten the strips in their compressed relation in the module to provide a fiber blanket assembly.

Instead of expanded metal, use can be made of metal or other sheet material having strength and dimensional stability, without the need for high temperature stability since the pins and retainer members are protected by the fiber layer from exposure to the high temperatures existing in the furnace. Similarly, the retainer members can be formed of open or expanded metal or of solid thin sheets which can be formed or molded to the desired shape. Also, other conventional means can be employed, such as other fastening means, or metal joining means, such as spot welding, for securing the ends of the pins 22 to the retainer members 20.

It will be recognized that the module components illustrated for a typical single module in FIGS. 1, 2 and 3 do not contain locked-in compressional forces in a direction parallel to the faces of strips of ceramic fiber blanket. The modular locked-in compressional forces occur only in a direction substantially perpendicular to the faces of the blanket strips. However, FIGS. 4 and 5 show respectively the hot inner face of an assemblage of modules and a cross section of this assemblage wherein the alternating 90° rotation of the orientation of the layers of blanket in adjacent modules causes compressional forces to be developed throughout the furnace lining in directions that are substantially parallel to the face of the furnace lining. Said compressional forces exerted within the blanket modules during prefabrication of said modules are of sufficient magnitude to slightly over-compensate for the shrinkage in the hot inner face portions of the lining, occasioned by exposure to furnace temperatures which would otherwise cause the lining to become fissured transversely to the hot face of the lining. Said transverse fissuring would afford passageways to excessive flow of heat from the inside of the furnace to the furnace exterior.

FIG. 5 shows attachment members 40 which engage the plurality of pins 22 and extend through the furnace exterior shell 42. Attachment members 40 are engaged at their end portions, which extend through the furnace shell, by fasteners 9. The attachment members 40 engage the pins 22 in any suitable manner but the hook engagement shown is a preferred embodiment. Likewise, fasteners 9 could be of any conventional fastener design.

Locating the attachment members 40 and the pins 22 inside the ceramic fiber module 10 near the cool outer face thereof affords several advantages:

It removes the members 22 and 40, which are usually fabricated from heat resistant alloy, from direct exposure to the deleterious effects of high temperature furnace gases and places them in a cooler region of the furnace lining. A less costly alloy can therefore be employed which will have superior life.

It places the points of contact between the furnace lining material and the supporting and binding members 40 and 22 in a cooler region of the furnace lining where the strength of the ceramic fiber blankets is greater than that prevailing at the hot inner face of the lining.

FIG. 5 shows back-up insulation 44 between the modules of ceramic fiber blankets and the furnace shell 42. It will be realized that this insulation 44 can be made any suitable thickness and may be installed in layers with staggered joints and of various materials without limiting the means which may be employed for practicing this invention.

FIG. 3 (a) shows an alternate shape of the ceramic fiber blanket strips 12a comprising a furnace lining module 10a wherein the strips are of trapezoidal configuration with the wider base of the trapezoid disposed in the plane of the hot inner face of the furnace lining. Thus, when the module 10a is drawn into position in an assembly of furnace lining modules, an appropriate lateral placement of the attachment members 40 in the furnace shell 42 will cause the module 10a to squeeze against adjacent modules and the original frustropyramidal configuration will approach a more rectilinear parallelopiped configuration. Said squeezing of the furnace lining modules, acting against the resilience of the ceramic fiber blanket material, causes the hot face of the modules 10a to develop compressional forces which compensate for thermal shrinkage of the ceramic blankets.

To line the furnace wall, the modules are mounted like files, preferably with adjacent files turned 90° to each other. Holes are drilled through the furnace walls and the pin hooks 40 are snaked through and hooked over the adjacent portion of the pin and then the hooks are pulled to draw the lining tightly against the furnace wall and fastened. Two or more hooks can be used for each pin securely to suspend the module on the furnace wall. Thus each module is secured into place to form a thick insulation layer of ceramic fibers over the furnace wall.

Other means for mounting the modules as a lining on the inner face of the furnace wall can be employed. For example, pins can be secured to the metal retainer members in laterally spaced apart relation for extension through suitable openings provided in the shell for extension therethrough into engagement with clips or fasteners. Such pins can extend from the end sections or base sections of such metal retainers. By way of still further modification, the hook members can hook over the end portions of the pins at the point of engagement with the retainers.

The base portion of the retainer members are not essential, and it would be sufficient merely to rely upon flat members arranged to embrace the side wall of the outermost strips in each module with pins 22 extending through the aligned strips to engage such retainer members.

It will be apparent that separate modules can be removed for replacement or repair merely by unhooking the module and engaging another releasably to mount the module in position of use.

Furnaces lined with modules of the type described remain effective for months to exposure to temperatures as high as 2,400°F. and for much longer times without the need for repair or replacement at lower temperatures.

We claim:

1. A modular assembly of high temperature ceramic fiber furnace lining material having an inner face which is adapted to face into the interior of the furnace and an outer face comprising strips of interbonded ceramic fibers arranged in side-by-side parallel relation with the fibers in the strips extending generally in the endwise direction in the strip, connecting members engaging the outermost of the aligned strips adjacent their outer face and remote from the inner face, and means for interconnecting said connecting members to grip the end portions of the aligned strips adjacent the outer face therebetween whereby the portions adjacent the inner face are free of the connecting members and the interconnecting members.

2. A modular assembly as claimed in claim 1 in which the connecting members are spaced one from the other in their interconnected relation by an amount less than the normal thickness of the combined strips whereby the fiber density of the assembled strips diminishes from the portion adjacent the outer face to the inner face.

3. A modular assembly as claimed in claim 2 in which the fibers of the strips are compressed by an amount up to 50 percent.

4. A modular assembly as claimed in claim 2 in which the fibers of the strips are compressed by an amount within the range of 20–40 percent of their normal width.

5. A modular assembly as claimed in claim 2 in which the fibers of the strips are compressed by an amount within the range of 25–30 percent of their normal width.

6. A modular assembly as claimed in claim 1 in which the fibers in the strip are interfelted to interbond the fibers in the strips.

7. A modular assembly as claimed in claim 1 in which the fibers in the strip are adhesively interbonded by an adhesive material.

8. A modular assembly as claimed in claim 7 in which the adhesive is an organic adhesive present in an amount within the range of 0.5–5 percent by weight of the fibrous material.

9. A modular assembly as claimed in claim 1 in which the connecting members comprise substantially rigid members which embrace the corner portions at the outer ends of the outermost strips and the means for interconnecting the connecting members comprising laterally spaced apart pins which extend through the aligned strips in closely spaced relation to their outer ends and means interconnecting the ends of the pins with the connecting members.

10. In a furnace, a lining formed of a plurality of modular assemblies secured to the wall of the furnace in side-by-side relation to cover the furnace wall, in which said modular assemblies are formed of strips of blanket felted of ceramic fiber disposed in substantially parallel layers, said layers being disposed substantially perpendicular to the hot face of the furnace lining, said layers of felted blanket being subjected to compressional forces vectorially disposed in directions substantially parallel to the hot face of the furnace lining, said compressional forces being resisted by tension members traversing the layers of said felted blanket.

11. A furnace lining as defined in claim 10 wherein the said tension members are located remotely from the hot face of the furnace lining.

12. A furnace lining as defined in claim 10 wherein the said tension members exert compressional forces upon said layers of felted blanket through blanket edge-binding means.

13. A furnace lining as defined in claim 10 wherein the said tension members serve also as means for attachment of the module to enclosure of the furnace.

14. A furnace lining of furnace lining modules as defined in claim 10 wherein said modules are oriented with 90° alternating rotation of the planes of the laminae of said felted blanket pieces.

15. A furnace lining as defined in claim 14 wherein compressional forces operating within the modules are vectorially disposed in all directions substantially parallel to the hot face of the furnace lining.

16. An assembly of furnace lining modules defined in claim 10 wherein said modules are formed of strips of felted ceramic fiber blanket having trapezoidal configuration and imparting to the modules a frustropyramidal configuration with base of the said frustropyramid forming the hot surface of the furnace lining.

17. A furnace lining comprising modular components formed of strips of ceramic fiber blanket having felted characteristics and having edges of said blanket strips disposed to form the hot faces of the furnace lining and having face surfaces of said blanket strips adjacent to either face surfaces or edges of other blanket strips forming the modules of the furnace lining and in compressive contact therewith, said compressive forces acting in directions substantially parallel to the hot face of the furnace lining, said compressive forces being derived from binding members passing laterally through the module and from forces acting between modules which are derived from means for the attachment means of said modules to the furnace exterior enclosure, said attachment means forces acting upon modules having substantially frustro-pyramidal configuration and developing lateral compressive components of said forces as the frustro-pyramidal shaped modules are squeezed into a more rectilinear parallelopiped configuration.

18. A furnace lining as defined in claim 17 wherein said compressive binding of said modules comprise means remotely located from the hot inner faces of the furnace.

* * * * *